United States Patent
Ji et al.

(10) Patent No.: US 8,964,676 B2
(45) Date of Patent: Feb. 24, 2015

(54) METHOD AND APPARATUS FOR TRANSMITTING SYSTEM INFORMATION IN A MOBILE COMMUNICATION SYSTEM

(71) Applicant: Samsung Electronics Co., Ltd., Gyeonggi-do (KR)

(72) Inventors: Hyoung-Ju Ji, Seoul (KR); Joon-Young Cho, Gyeonggi-do (KR); Young-Bum Kim, Seoul (KR); Seung-Hoon Choi, Gyeonggi-do (KR); Sang-Min Ro, Seoul (KR); Ju-Ho Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 229 days.

(21) Appl. No.: 13/674,389

(22) Filed: Nov. 12, 2012

(65) Prior Publication Data

US 2013/0121249 A1    May 16, 2013

(30) Foreign Application Priority Data

Nov. 11, 2011  (KR) .................. 10-2011-0117863
Mar. 22, 2012  (KR) .................. 10-2012-0029385

(51) Int. Cl.
  *H04W 4/00*    (2009.01)

(52) U.S. Cl.
  USPC ............................................. 370/329

(58) Field of Classification Search
  CPC ..... H04W 80/04; H04W 88/06; H04W 28/04; H04W 72/04
  USPC .................................................. 370/328, 329
  See application file for complete search history.

(56) References Cited

U.S. PATENT DOCUMENTS

| | | | |
|---|---|---|---|
| 2008/0144751 A1 | 6/2008 | Xia et al. | |
| 2010/0260118 A1 | 10/2010 | Taoka et al. | |
| 2011/0092231 A1 | 4/2011 | Yoo et al. | |
| 2011/0194637 A1 | 8/2011 | Jiang et al. | |
| 2011/0280190 A1* | 11/2011 | Sakata et al. | 370/328 |
| 2011/0310854 A1* | 12/2011 | Zou et al. | 370/336 |
| 2012/0034948 A1* | 2/2012 | Wang et al. | 455/522 |

* cited by examiner

*Primary Examiner* — Ronald Abelson
(74) *Attorney, Agent, or Firm* — The Farrell Law Firm, P.C.

(57) ABSTRACT

A method and apparatus are provided for transmitting system information in a mobile communication system. The method includes configuring system information including first antenna configuration information and second antenna configuration information, and broadcasting the system information. The first antenna configuration information includes information about a number of antennas of a base station.

24 Claims, 13 Drawing Sheets

METHOD AND APPARATUS FOR TRANSMITTING SYSTEM INFORMATION IN A MOBILE COMMUNICATION SYSTEM

PRIORITY

This application claims priority under 35 U.S.C. §119(a) to Korean Patent Application Serial No. 10-2011-0117863, which was filed in the Korean Intellectual Property Office on Nov. 11, 2011, and Korean Patent Application Serial No. 10-2012-0029385, which was filed in the Korean Intellectual Property Office on Mar. 22, 2012, the entire disclosure of each of which is incorporated herein by reference.

BACKGROUND OF THE INVENTION

1. Field of the Invention

The present invention relates generally to a method and apparatus for transmitting system information in a mobile communication system, and more particularly, to a method and apparatus in which a terminal incapable of multi-antenna reception may access a cell supporting multi-antenna transmission and receive system information from the cell in an Orthogonal Frequency Division Multiplexing (OFDM) system.

2. Description of the Related Art

Mobile communication systems have been developed to provide voice services while ensuring the mobility of users. The mobile communication systems have gradually expanded their coverage to data services from the voice services, now making it possible to provide high-speed data services. However, in the currently available mobile communication systems, the systems suffer from lack of resources, and because users require services having higher speeds, more advanced mobile communication systems are required.

Long Term Evolution-Advanced (LTE-A) is one of the next-generation mobile communication systems, which have been developed in response to these demands, and its standardization is underway in the 3rd Generation Partnership Project (3GPP). LTE-A is a technology for implementing high-speed packet-based communication having a data rate of a maximum of 1 Gbps. To this end, several methods have been discussed, such as a method of multiplexing the network structure so that multiple base stations may cover a specific area in an overlapping manner, and a method of increasing the number of frequency bands supported by one base station.

Recently, it has become possible to easily obtain and deliver the necessary information anytime and anyplace by connecting all things around us over the network, and Machine-to-Machine/Inter of Things (M2M/IoT) that enables provision and usage of various services based thereon is the key issue for the next-generation communications market. M2M has started with the sensor and Radio Frequency Identification (RFID) networks that mainly cover local areas, but due to the growing diversity of its applications and features, it may be used for various wired/wireless networks. The interest in M2M based on mobile communication networks has increased in consideration of the mobility of objects, wide service areas, ease of operation and maintenance of the networks, security for high-reliability data transmission, and guarantee of service qualities. For these data, very small packets need to be transmitted, and their transmission cycle is very long. About 30,000 of such terminals (or M2M terminals) can exist in one cell, so the existing base station that handles hundreds of general terminals (or mobile terminals) has significantly increased in terms of the number of terminals it should handle.

Reflecting this, the 3rd Generation Partnership Project (3GPP), has proceeded with the full-scale standardization work with a name of Machine Type Communications (MTC) since 2008, starting with a feasibility study for M2M in 2005. These MTC terminals cannot receive multi-antenna transmission since they are produced at a low cost. In other words, if having multiple antennas, a base station transmits a control channel using multiple antennas, but the MTC terminal may not access the base station because it cannot receive this multi-antenna transmission. If the base station performs single-antenna transmission to all of its terminals even though it has multiple antennas, coverage of its cell is reduced, so the existing terminals (i.e., mobile terminals) may suffer from degradation of the reception quality.

An OFDM transmission scheme, a multi-carrier scheme of transmitting data using multiple carriers, is a kind of Multi Carrier Modulation (MCM) that converts a serial input symbol stream into parallel symbol streams, and modulates each of the parallel symbol streams with multiple carriers (i.e., multiple sub-carrier channels) based on the orthogonal relationship between them, before transmission.

A system employing MCM was first applied to military high-frequency radio receivers in the late 1950s, and the OFDM scheme, in which multiple orthogonal subcarriers overlap, has begun to be developed since the 1970s. However, the system employing MCM had a limitation on its application to the actual systems because of the difficulty in implementing orthogonal modulation between multiple carriers. Nevertheless, development of the OFDM technology has proceeded rapidly since Weinstein et al. announced in 1971 that the OFDM-based modulation/demodulation can be efficiently processed using Discrete Fourier Transform (DFT). In addition, with the introduction of the new approach of using a guard interval and inserting Cyclic Prefix (CP) symbols in the guard interval, the negative impacts of the multipath and delay spread on the systems have been further reduced.

Thanks to the development of these technologies, OFDM technology is now widely applied to digital transmission technologies such as Digital Audio Broadcasting (DAB), Digital Video Broadcasting (DVB), Wireless Local Area Network (WLAN), and Wireless Asynchronous Transfer Mode (WATM). In other words, the OFDM scheme, which was not widely used due to its hardware complexity, may now be implemented with the development of various digital signal processing technologies including Fast Fourier Transform (FFT) and Inverse Fast Fourier Transform (IFFT).

Although similar to the conventional Frequency Division Multiplexing (FDM) scheme, the OFDM scheme may obtain its optimal transmission efficiency during high-speed data transmission by maintaining the orthogonality among multiple tones. In addition, the OFDM scheme may obtain the optimal transmission efficiency during high-speed data transmission because it has high frequency efficiency and is robust against multipath fading.

As another advantage of the OFDM scheme, the OFDM scheme has high frequency efficiency and is robust against frequency selective fading and multipath fading since it uses the frequency spectra in an overlapping manner, and with the use of a guard interval, the OFDM scheme can reduce Inter Symbol Interference (ISI), ensure simple design of the hardware structure of an equalizer, and is robust against impulse noises. Thus, the OFDM scheme is widely used in the communication system structure.

In wireless communications, high-speed high-quality data services may be interrupted generally due to channel environments. In wireless communications, the channel environments may vary frequently due to the change in power of received signals, caused not only by Additive White Gaussian Noise (AWGN) but also by fading; the Doppler effects based on shadowing, movement of terminals, and frequent changes in speed of terminals; and interference by other users and multipath signals. Therefore, these factors worsening the channel environments need to be effectively reduced in order to support the high-speed high-quality data services in wireless communications.

In the OFDM scheme, a modulation signal is located in two-dimensional resources consisting of time and frequency resources. Resources in the time domain are distinguishable by different OFDM symbols, which are orthogonal with each other. Resources in the frequency domain are distinguishable by different tones, which are also orthogonal with each other. In other words, in the OFDM scheme, one minimum unit resource may be indicated by designating a specific OFDM symbol in the time domain and a specific tone in the frequency domain, and the unit resource is called a Resource Element (RE). Different REs are orthogonal with each other even after experiencing a frequency selective channel, so signals transmitted with different REs may be received at a receiver without mutual interference.

A physical channel is a channel of a physical layer, which carries modulation symbols obtained by modulating one or more coded bit streams. An Orthogonal Frequency Division Multiple Access (OFDMA) system configures and transmits multiple physical channels differently depending on the usage and receiver of transmission information streams. For each physical channel, a transmitter and a receiver should agree in advance to determine to which RE they will match to the physical channel, and this rule is called 'mapping'.

Therefore, there is a need for a method in which a base station with multiple antennas may support both of terminals capable of multi-antenna reception and terminals incapable of multi-antenna reception (i.e., the terminals capable of single-antenna reception).

SUMMARY OF THE INVENTION

Accordingly, the present invention is designed to address at least the problems and/or disadvantages described above and to provide at least the advantages described below.

An aspect of the present invention is to provide a method and apparatus in which a base station transmits system information in a transmission mode in which all terminals can receive the information, if a terminal(s) incapable of receiving multi-antenna transmission supported by the base station exists in the cell, when the base station transmits the system information using the multi-antenna transmission.

Another aspect of the present invention is to provide a method and apparatus for solving the problems that if a terminal(s) incapable of receiving multi-antenna transmission supported by a base station exists in the cell, the cell coverage is reduced, causing an increase in the number of terminals incapable of accessing the cell, and if the base station keeps its multi-antenna transmission mode, a terminal(s) incapable of supporting the multi-antenna transmission mode may not access the cell.

In accordance with an aspect of the present invention, a method is provided for transmitting system information in a mobile communication system. The method includes configuring system information including first antenna configuration information and second antenna configuration information, and broadcasting the system information. The first antenna configuration information includes information about a number of antennas of a base station.

In accordance with another aspect of the present invention, an apparatus is provided for transmitting system information in a mobile communication system. The apparatus includes a system information generator that configures system information including first antenna configuration information and second antenna configuration information, and a transmitter that broadcasts the system information. The first antenna configuration information includes information about a number of antennas of a base station.

In accordance with another aspect of the present invention, a method is provided for receiving system information in a mobile communication system. The method includes receiving system information on a broadcast channel, and extracting first antenna configuration information and second antenna configuration information included in the system information. The first antenna configuration information includes information about a number of antennas of a base station.

In accordance with another aspect of the present invention, an apparatus is provided for receiving system information in a mobile communication system. The apparatus includes a receiver that receives system information on a broadcast channel, and a controller that extracts first antenna configuration information and second antenna configuration information included in the system information. The first antenna configuration information includes information about a number of antennas of a base station.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The terms or words used in the below-described specification and claims should not be limited to the ordinary or lexical meanings, and should be construed as the meanings and concepts that meet the technical spirit of the invention.

Although an LTE system, an LTE-Advanced system, and the future system compatible with legacy systems will be described in this specification by way of example, the present invention is not limited thereto, and may be applied to any other multi-carrier mobile communication systems.

The present invention is applicable to both an LTE system and an LTE-A system. In the following description, the term 'LTE' may be construed to include both the LTE system and the LTE-A system. As for the system to which the present invention is applicable, a Release 11 LTE (Rel 11 LTE) system will be considered herein as a post LTE-A system, but the present invention is not limited thereto.

Figure 1:
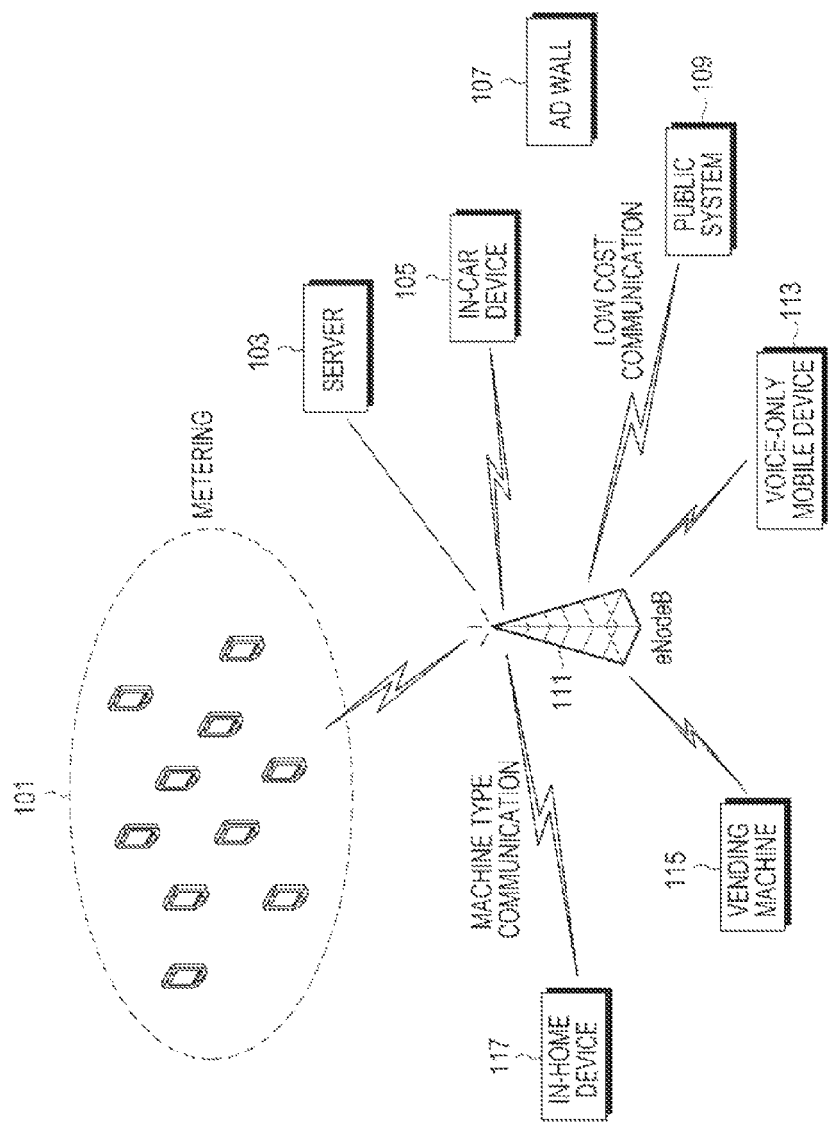
FIG. 1 illustrates an OFDM system.

FIG. 1 illustrates an OFDM system.

Referring to FIG. 1, the data received from terminals 101 and 113, or transmitted to the terminals 101 and 113 generally has one of two destinations. An example of data transmittable to the terminals is voice data. Another kind of data is data that is transmitted to a server 103 as its destination. The data is transmitted and received though base station or eNodeB 111. The server 103 is a final destination or an intermediate destination of the data, and the terminals 101 and 113 communicate with the server 103. Reference numeral 101 indicates MTC terminals, which are terminals for metering or reporting their environments or facilities. These terminals may be used for various other purposes as well as the reporting. As typical examples, the terminals may be used for transmission of public traffic information 109, indoor/outdoor advertising facilities 107, home appliances 117, and vending machine 115, including metering of the environments. If MTC terminals are added, these devices may be installed without the use of wires regardless of their installation places. Most of these MTC terminals are stationary and used as additional devices for other devices, so they need to be implemented at a low cost not only in terms of functions, but also in terms of structures. In addition, most of the MTC terminals will have a function capable of only narrowband transmission, since these devices do not require a large amount of data.

Figure 2:
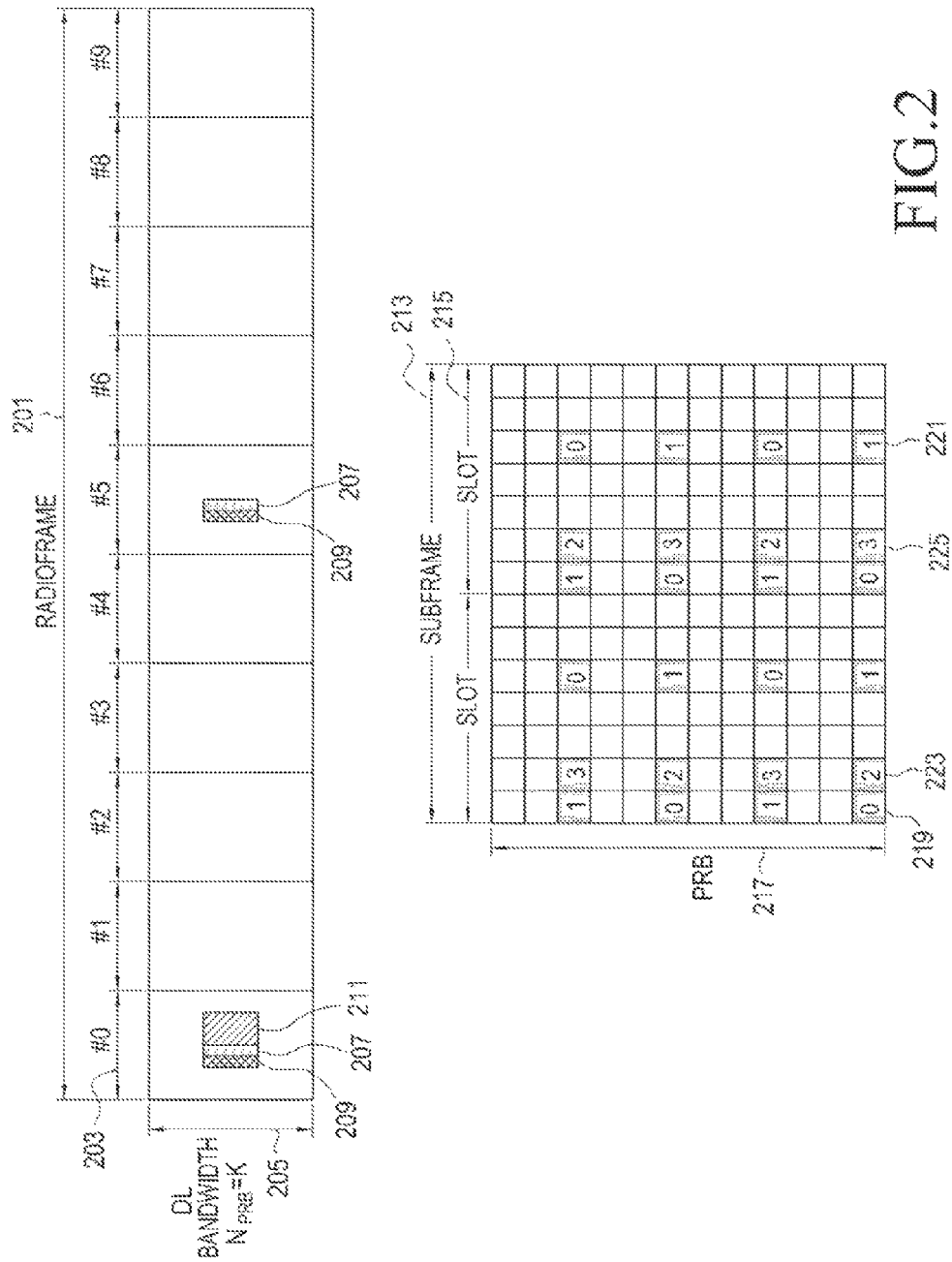
FIG. 2 illustrates a system information transmission structure in an OFDM system.

FIG. 2 illustrates a downlink frame structure and a resource structure in an OFDM system.

Generally, in the OFDM system, the entire downlink transmission bandwidth 205 includes a plurality of Resource Blocks (RBs), and each Physical Resource Block (PRB) 217 may include 12 frequency tones (or subcarriers) arranged in the frequency domain, and 14 OFDM symbols (or 12 OFDM symbols) arranged in the time domain. The PRB is a basic unit for resource allocation. Reference Signals (RSs) 219, 221, 223 and 225 are signals, which are agreed upon between terminals and a base station in advance, and are transmitted to the terminals so that they may perform channel estimation, and in the LTE system, the RSs are classified into Common Reference Signals (CRSs) and Dedicated Reference Signals (DRSs). Reference numeral 219 represents a CRS transmitted by a first antenna port; reference numeral 221 represents a CRS transmitted by a second antenna port; reference numeral 223 represents a CRS transmitted by a third antenna port; and reference numeral 225 represents a CRS transmitted by a fourth antenna port. As for the CRSs transmitted from the first and second antenna ports, a total of 8 CRSs exist in one PRB, and as to the CRSs transmitted from the third and fourth antenna ports, a total of 4 CRSs exist in one PRB.

The frequency band 205 of the LTE system occupies a system bandwidth defined in the frequency domain, and may have a band of a minimum of 1.4 MHz to a maximum of 20 MHz. In the LTE system that supports these various frequency bandwidths, a terminal may not know the system bandwidth in advance before making its initial access to the LTE system, so the terminal transmits a signal for initial access using only the bandwidth of 1.4 MHz, which is the minimum bandwidth supported by the LTE system. Therefore, the terminal searches the cell by filtering only the band of 1.4 MHz in the entire downlink band during an initial cell search period, and after completion of the search, the terminal recognizes actual system bandwidth information by receiving system information, adjusts a frequency filter of its receiver in accordance with the system bandwidth, and then receives the entire band.

In FIG. 2, the signals and channels used for initial access, which are transmitted in the minimum bandwidth for initial access, include a Primary Synchronization Signal (PSS) 207, a Secondary Synchronization Signal (SSS) 209, and a Physical Broadcast CHannel (PBCH) 211. The PSS 207 and the SSS 209 are signals used to recognize a cell IDentifier (ID) of the cell, and the PBCH 211 is a channel used to transmit a Master Information Block (MIB) in a System Information Block (SIB) for the base station.

Regarding the structure of a system bandwidth in the time domain, the LTE system configures a radioframe with a length of 10 msec as shown by reference numeral 201. One radioframe includes 10 subframes 203 and 213 with a length of 1 msec, and one subframe includes two slots 215 with a length of 0.5 msec. The PSS 207 and the SSS 209 are transmitted in a first slot of each of the subframes #0 and #5, and they are configured such that the SSS is first transmitted and the PSS is transmitted in the next symbol as shown by reference numerals 209 and 207. The PBCH 211 is transmitted in a second slot in the subframe #0, occupying a total of 4 symbol regions. In the LTE system, in the initial access process of a terminal, the temporal positions and frequency (or spectral) positions of the PSS, the SSS and the PBCH are very important, and play an important role in the initial access process of a terminal.

Multi-antenna transmission of a base station applies the multi-antenna transmission technique used in the PBCH, to all control channels, so the terminal should be able to determine the number of antennas presently used by the base station, by initially receiving the PBCH. In other words, the base station does not exactly inform the terminal of the number of antennas in its use, and the terminal should determine the number of antennas during its demodulation operation. To this end, the base station uses another transmission method associated with the number of antennas in use, for PBCH transmission, and the terminal determines the number of antennas by demodulating the PBCH. If the number of antennas in use is one, the base station performs single-antenna transmission using only the first CRS as shown by reference numeral 219, and transmits the PBCH without the use of the resources 223, 225 and 221. In addition, the base station scrambles information about the number of antennas in a CRC of the PBCH before transmission.

If the PBCH is transmitted using two antenna ports, the base station transmits the PBCH using a 2-antenna transmission mode. In this case, the base station uses the CRSs 219 and 221 for PBCH transmission, and does not use the resources 223 and 225 for PBCH transmission. In addition, the base station scrambles information about the number of antennas in a CRC.

If the PBCH is transmitted using four antenna ports, the base station transmits the PBCH using a 4-antenna transmission mode, and uses all of the resources 219, 221, 223 and 225 for PBCH transmission. Similarly, the base station scrambles information about the number of antennas in a CRC. The reason why the base station does not use some CRSs when the number of antennas in use is one or two, is to prevent a coding rate from varying depending on the number of antennas used by the PBCH, and to solve the problems which may occur when the number of antennas is incorrectly recognized.

Figure 3:
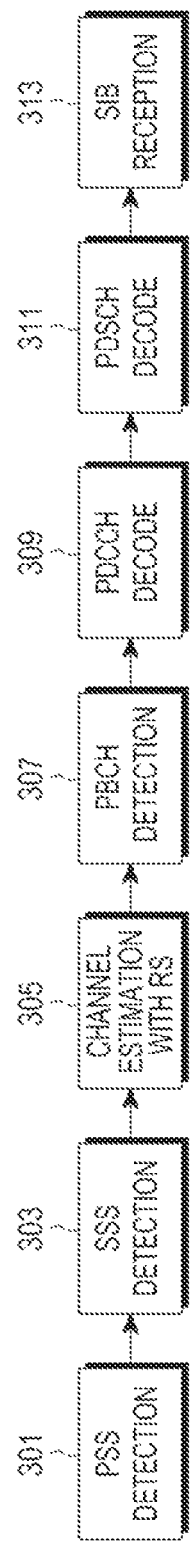
FIG. 3 illustrates an initial access procedure of a terminal in an OFDM system.

FIG. 3 illustrates an initial access process of a terminal in an OFDM system.

Referring to FIG. 3, the terminal receives a PSS in step 301. The terminal may receive synchronization of 5 msec since the PSS is transmitted at periods of 5 msec. In step 303, the terminal receives an SSS, which is located just ahead of the received PSS. Because the SSS is transmitted at periods of 5 msec and a different signal is sent every 5 msec, the terminal may determine whether the transmitted SSS is transmitted in a subframe #0 or whether it is transmitted in a subframe #5. Upon receiving the PSS and the SSS, the terminal may recognize a cell ID of the cell it has accessed presently, using information about the two received signals. By recognizing the cell ID, the terminal may determine an exact position of the RS that a base station has transmitted, because the position of the RS is mapped to a different resource depending on the cell ID.

Upon determining the position of the RS, the terminal estimates a channel for each of the cases where the base station has one antenna, two antennas and four antennas, in step 305, because the terminal does not know the number of antennas that the base station uses presently. Using the channel estimation information, the terminal receives a PBCH in step 307.

During PBCH reception, demodulation of a PBCH where the number of antennas passing the CRC test is identical to the number of antennas used for channel estimation is determined as the number of antennas that the base station actually uses, and the terminal prepares for demodulation, determining that the multi-antenna transmission method used for PBCH transmission is used for all of the control channels that the base station transmits. Upon receiving the PBCH, the terminal detects, from the received PBCH, a MIB that is its most necessary information in the system information. The MIB includes basic information used to receive another channel, and based on this information, the terminal receives a control channel (e.g., Physical Downlink Control CHannel (PDCCH)) in step 309, and receives a data channel (e.g., Physical Downlink Shared CHannel (PDSCH) using scheduling information of the received control channel in step 311. The terminal needs to receive the control channel and the data channel, in order to receive the remaining system information except for the MIB in step 313.

Figure 4:
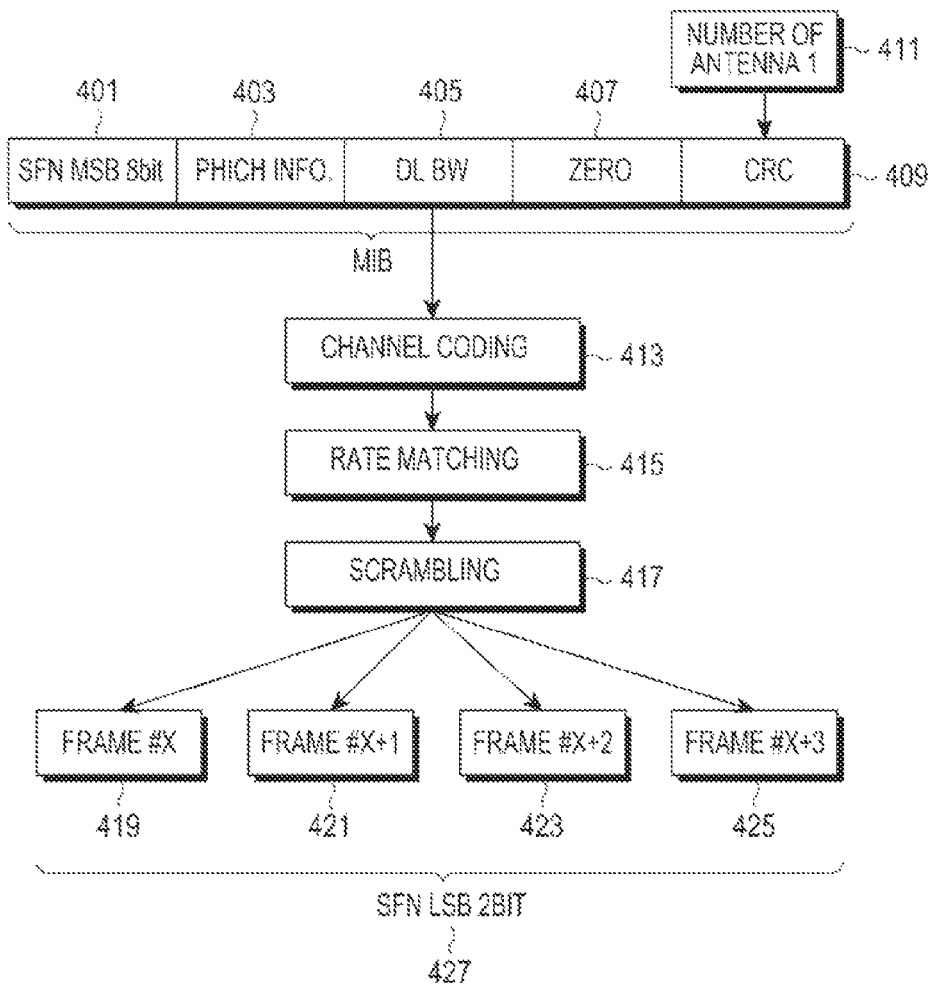
FIG. 4 illustrates a system information transmission method in an OFDM system.

FIG. 4 illustrates system information transmitted on a PBCH and a structure for transmitting the system information.

Referring to FIG. 4, a MIB includes important system information, which is classified into system information directly delivered on a PBCH and system information indirectly delivered on the PBCH. The MIB includes a System Frame Number (SFN) 401, response channel (Physical Hybrid Automatic Repeat-reQuest (HARQ) Indicator Channel (PHICH)) information 403, downlink bandwidth information 405, a CRC 409, and antenna configuration information 411. Among others, the antenna configuration information 411, as described above, is scrambled in the CRC 409 of the PBCH and transmitted indirectly. In the following description, configuration information of an antenna(s) that a base station actually uses will be referred to as "first antenna configuration information".

In addition, the MIB has the downlink bandwidth information 405, which is information about the bandwidth that the base station actually uses, and this is information about the bandwidth that an MTC terminal may not receive, and is different from information about the bandwidth that the MTC terminal uses. That is, the downlink bandwidth information 405 is used for general terminals or mobile terminals. The PHICH configuration information 403, which is other information included in the MIB, is downlink response channel-related information, which is also the information that general terminals requires for reception of control channels, but the information that the MTC terminal does not require because it cannot fully manage the entire system bandwidth. The SFN included in the MIB is information of a total of 10 bits, of which only 8 bits are transmitted for the MIB and the other 2 bits are transmitted indirectly.

During indirect transmission, the MIB undergoes channel coding in step 413, and undergoes rate matching in step 415, in which its length is adjusted to be 4 times that of the actual PBCH resource. In step 417, the 4-fold replicated PBCH is scrambled with one scrambling code. The scrambled PBCH is divided into four equal parts, which are transmitted in frames 419, 421, 423 and 425, respectively. Accordingly, the same PBCH is transmitted in each frame, but a different scrambled PBCH exists in each frame and the terminal may identify it.

Therefore, depending on the position of a frame where a PBCH is demodulated, the frame 419 means that LSB 2 bits 427 of the SFN are '00', the frame 421 means that LSB 2 bits are '01', the frame 423 means that LSB 2 bits are '10', and the frame 425 means that LSB 2 bits are '11', so it is possible to know the entire SFN.

As described above, an MTC terminal may not receive a PBCH depending on the antenna configuration of the base station and its associated transmission mode, and information transmitted on the PBCH is also information unnecessary for MTC, except for the SFN. Therefore, the base station should deliver system information necessary for MTC in another method, instead of transmitting a PBCH in a transmission mode in which the MTC terminal may receive control channels, for the MTC terminal, unlike its antenna configuration.

Figure 5:
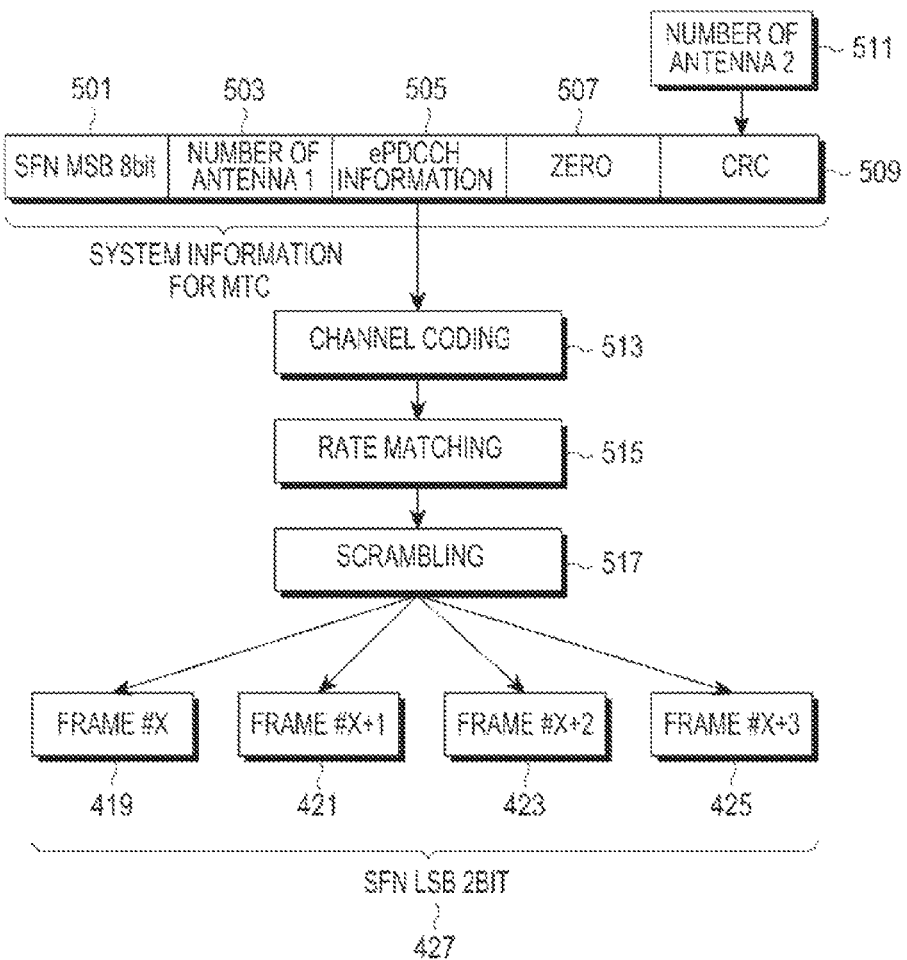
FIG. 5 illustrates a system information transmission method according to an embodiment of the present invention.

FIG. 5 illustrates a method for delivering system information to an MTC terminal by a base station according to an embodiment of the present invention.

Referring to FIG. 5, the base station divides system information for an MTC terminal into first antenna configuration information and second antenna configuration information. The base station has a first antenna configuration and a second antenna configuration, and the first antenna configuration includes the second antenna configuration. In addition, for an existing terminal, the base station transmits first system information with the first antenna configuration, and for an MTC terminal, the base station transmits second system information with the second antenna configuration, and transmits first antenna information in the second system information. For example, if the base station has four antenna ports, a first antenna configuration corresponds to four antenna ports 0 to 3, and if an MTC terminal supports 1-antenn port reception, a second antenna configuration corresponds to an antenna port 0.

The first system information for the existing terminal is transmitted using first antenna configuration information shown by reference numeral 411 as in FIG. 4.

For the MTC terminal, the second system information is transmitted using second antenna configuration information 511, and the second system information includes first antenna configuration 503.

Upon receiving this information, the MTC terminal uses channel estimation information based on the second antenna configuration information 511 for its data demodulation, but uses the first antenna configuration information 503 for actual data resource mapping.

Specifically, FIG. 5 illustrates second system information 501, 503, 505, 507, 509, and 511 for an MTC terminal. If including an SFN 501, the second system information includes first antenna information 503 that the base station actually uses for its transmission to both the MTC terminal and the existing terminal, and ePDCCH information 505 that the MTC terminal uses for reception of control channels.

For a CRC 509, a CRC is used, which is scrambled using the second antenna information 511 that the MTC terminal actually uses for its reception. Therefore, the transmission mode for transmission of the second system information transmits information based on the second antenna configuration information 511.

Reference numeral 507 represents a part, to which meaningless values are added when the actually transmitted system information is less in bit size than the maximum transmittable system information.

Steps 513 to 417 in FIG. 5 are the same as steps 413 to 417 in FIG. 4, and a method of transmitting LSB 2 bits of the SFN is the same as the process of transmitting first system information in FIG. 4.

In FIG. 5, the first system information is for the existing terminal, and the existing terminal is a terminal capable of system bandwidth reception. This terminal cannot read the second system information, which is for an MTC terminal. The MTC terminal is a terminal capable of receiving a bandwidth that is less than the system bandwidth. The MTC terminal cannot read the first system information.

Figure 6:
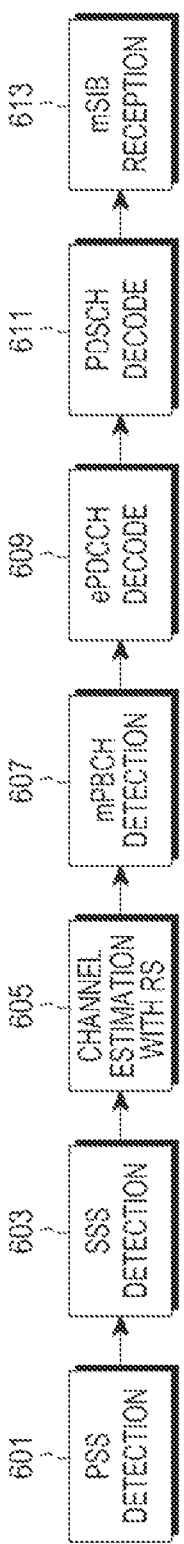
FIG. 6 illustrates a reception procedure of a terminal according to an embodiment of the present invention.

FIG. 6 illustrates a process of receiving second system information in a terminal according to an embodiment of the present invention.

Referring to FIG. 6, the terminal receives a PSS in step 601. Thereafter, in step 603, the terminal receives an SSS and recognizes a cell ID. In step 605, the terminal estimates a channel using the maximum number of its receivable antennas, which is less than or equal to the number of base station's transmittable antennas. In step 607, the terminal receives second system information, e.g., mPBCH. The second system information is for an MTC terminal, and upon demodulation of the second system information and pass of a CRC test, the terminal obtains second antenna configuration information, and recognizes first antenna configuration information in the received second system information. Thereafter, the terminal uses channel information based on second antenna information, for reception of control channels, and uses first antenna information for data mapping/demapping. In data mapping/demapping, it is assumed that an antenna port(s) indicated by the first antenna information is not involved in data mapping/demapping.

In step 609, the terminal receives an ePDCCH, and in step 611, receives a data channel based on information transmitted on the ePDCCH. The MTC terminal, which is capable of receiving a control channel and a data channel, receives the remaining system information on the data channel in step 613.

Figure 7:
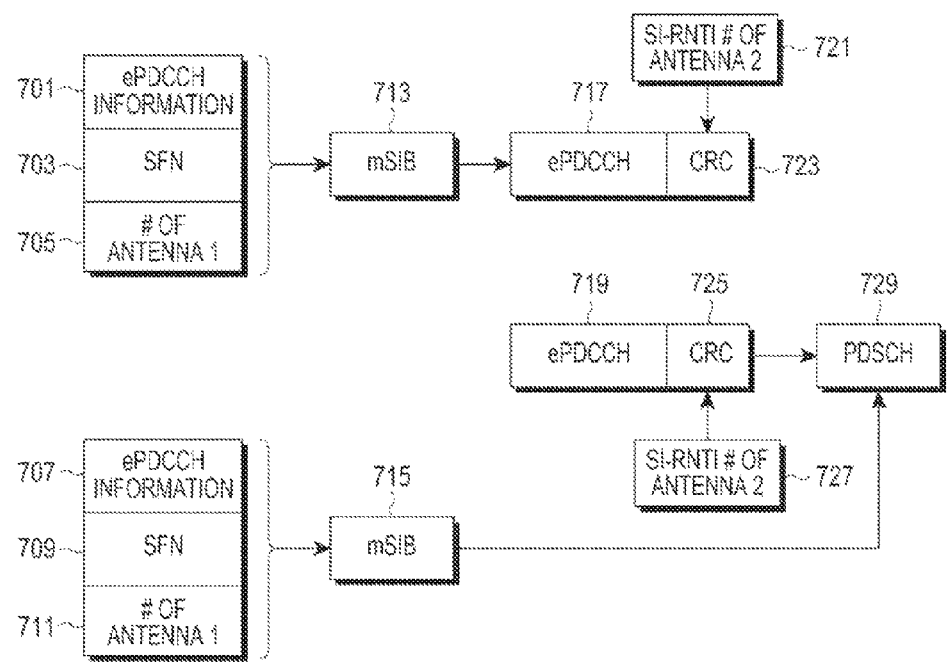
FIG. 7 illustrates a system information transmission method according to an embodiment of the present invention.

FIG. 7 illustrates a method for transmitting second system information for an MTC terminal according to an embodiment of the present invention.

Referring to FIG. 7, the base station divides system information for an MTC terminal into first antenna configuration information and second antenna configuration information. The base station has a first antenna configuration and a second antenna configuration, and the first antenna configuration includes the second antenna configuration. In addition, for the existing terminal, the base station transmits first system information with the first antenna configuration, and for the MTC terminal, the base station transmits a control channel with the second antenna configuration, and includes second system information in information about the control channel. Alternatively, to transmit the second system information for the MTC terminal, the base station transmits a control channel with the second antenna configuration, and transmits second system information on a data channel using scheduling information of the control channel.

The base station configures second system information 713 using information for ePDCCH reception 701, an SFN 703, and first antenna information 705. This information is directly transmitted on a control channel 717.

In order to make it possible to receive an ePDCCH before receiving information for ePDCCH reception 701 and the first antenna information 705, for control channel transmission for transmitting second system information, the base station performs data mapping for transmission of the ePDCCH 717, assuming that all of four antenna ports are used, regardless of the antenna configuration information 705, and transmits data in predetermined positions where all terminals may receive the data, regardless of the information for ePDCCH reception 701.

In addition, for a CRC test on a control channel, the base station scrambles a CRC with second antenna configuration information 721 and scrambles it using a System information-Radio Network Temporary Identifier (SI-RNTI), thereby making it possible to recognize a control channel transmission mode upon receiving the control channel. If the base station transmits scheduling information for second system information using a control channel, and transmits the second system information on a data channel, this is similar to the above-described method of transmitting second system information on a control channel. Even in this case, for reception of an ePDCCH 719, the base station performs data mapping, assuming that all of the four antenna ports are used, regardless of antenna configuration information 711, and transmits data in predetermined positions where all terminals may receive the data, regardless of information 707.

For a CRC test on a control channel, the base station scrambles a CRC with second antenna configuration information 725 and scrambles it using an SI-RNTI, thereby making it possible to recognize a control channel transmission mode upon receiving the control channel.

Figure 8:
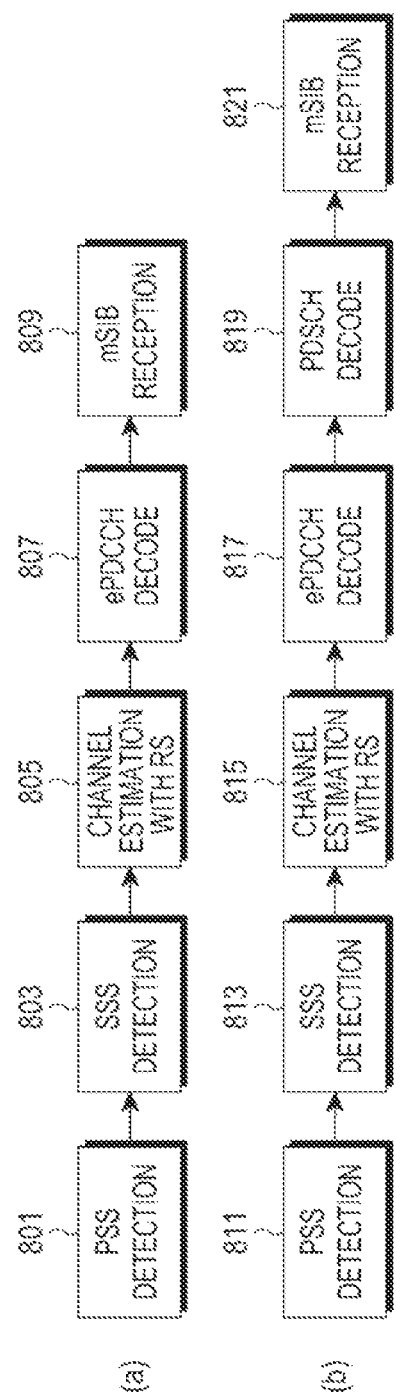
FIG. 8 illustrates reception procedures of a terminal according to an embodiment of the present invention.

FIG. 8 illustrates reception procedures of a terminal according to an embodiment of the present invention.

In part (a) of FIG. 8, for the existing terminal, the base station transmits first system information with a first antenna configuration, and for the MTC terminal, the base station transmits a control channel with a second antenna configuration and transmits second system information in information about the control channel.

In part (b) of FIG. 8, for the MTC terminal, the base station transmits a control channel with a second antenna configuration, and transmits second system information on a data channel using scheduling information for the control channel.

Referring to part (a) of FIG. 8, the terminal receives a PSS in step 801, and receives an SSS and recognizes a cell ID in step 803. In step 805, the terminal estimates a channel depending on its reception antenna. Thereafter, in step 807, the terminal receives an ePDCCH for second system information in a predetermined position.

In a received data demapping step, the terminal receives data, assuming that all of four antenna ports are used, and for demodulation, the terminal detects second antenna configuration information in a CRC test step. In step 809, the terminal detects first antenna configuration information by receiving a control channel.

Referring to part (b) of FIG. 8, the terminal receives a PSS in step 811, and receives an SSS and recognizes a cell ID therefrom in step 813. In step 815, the terminal estimates a channel depending on its reception antenna. In step 817, the terminal receives an ePDCCH in a predetermined position.

In a received data demapping step, the terminal receives data, assuming that all of four antenna ports are used, and for demodulation, the terminal detects second antenna configuration information and recognizes scheduling information in a CRC test step. In step 819, the terminal receives a data channel using the scheduling information, and even during data channel reception, the terminal performs data demapping, assuming that all of four antenna ports are used. In step 821, the terminal receives second system information by receiving the data channel.

Figure 9:
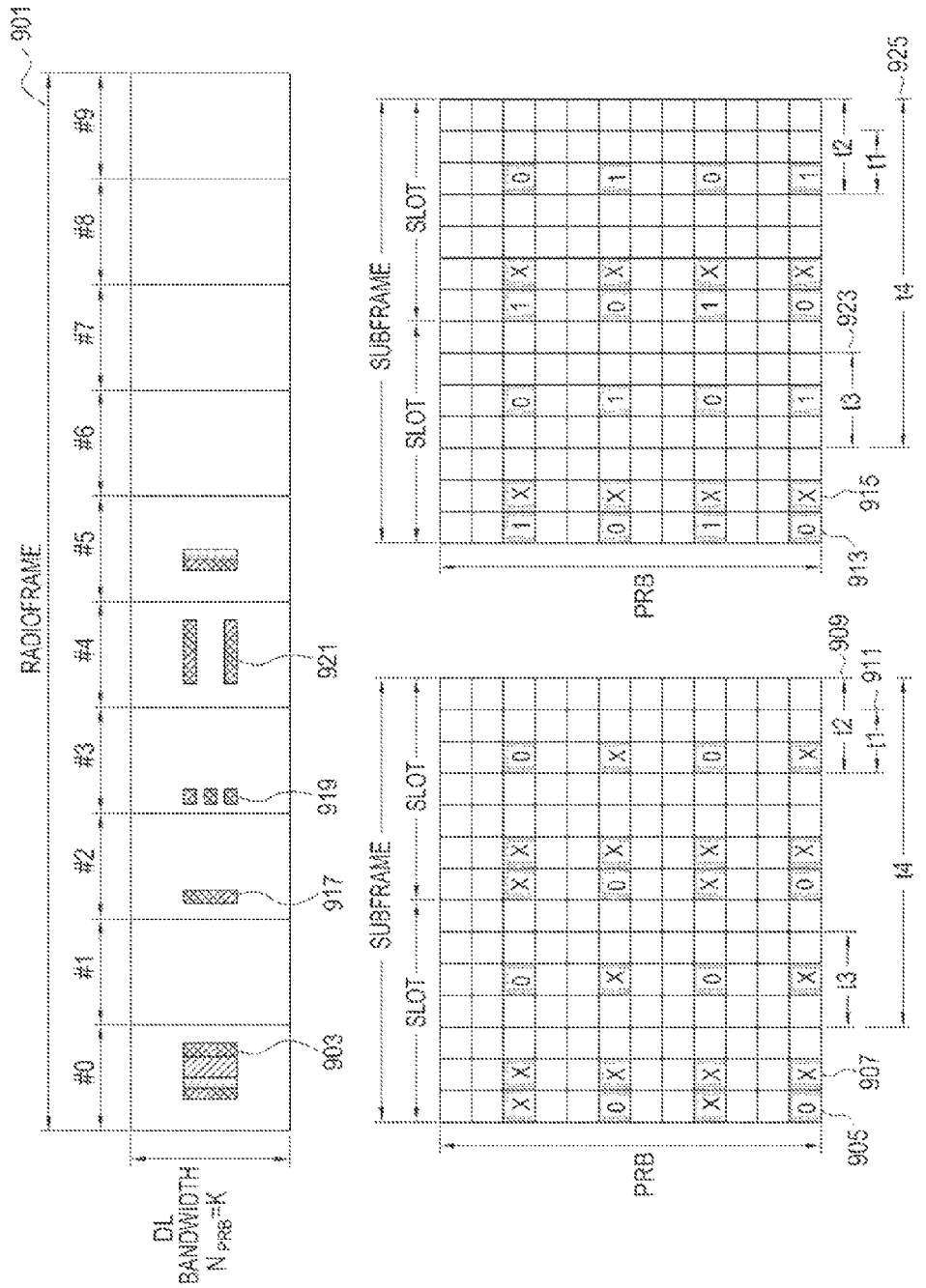
FIG. 9 illustrates a system information transmission structure according to an the present invention.

FIG. 9 illustrates resource positions for transmitting second system information according to an embodiment of the present invention.

Referring to FIG. 9, from the viewpoint of a radioframe 901, second system information may be transmitted as shown by reference numeral 903, where second system information is transmitted in a symbol following the position where the existing first system information is transmitted. In the actual time domain, the second system information is transmitted in a position 911 or 909, and this information is transmitted in the same position even in the structure of both FDD and TDD. For data mapping, if the base station uses four antenna ports and the MTC terminal can receive only one antenna port, resources 907 are not used for transmission of second system information, and resource positions 905 are used for channel estimation information for reception of second system information. However, if the MTC terminal is capable of 2-antena port reception, resources 915 are not used for transmission of second system information, and channel estimation information for two antenna ports 913 and 915 are used for reception of second system information.

Another example of transmitting second system information uses some symbols of a data channel as shown by reference numeral 917. This information is to be transmitted in a fixed subframe, and in the actual time domain, the second system information is mapped to fourth to sixth symbols 923. The second system information is transmitted over the entire band where the MTC terminal can receive data, so all MTC terminals may receive system information without receiving information from the base station.

In the frequency domain, the system information is transmitted over the entire band, as shown by reference numeral 919, but it may be transmitted using only some PRBs. In this case, the PRBs are transmitted in predetermined positions.

Another transmission example is a method of transmitting system information on a data channel of a specific PRB as shown by reference numeral 921, wherein in the time domain, the system information is transmitted over the entire data region 925, and in the frequency domain, only a specific PRB is used for the transmission. This facilitates multiplexing another data channel with the ePDCCH channel, and even in this case, the PRB used uses resources predetermined the MTC terminal, thereby making it possible to receive the system information.

Figure 10:
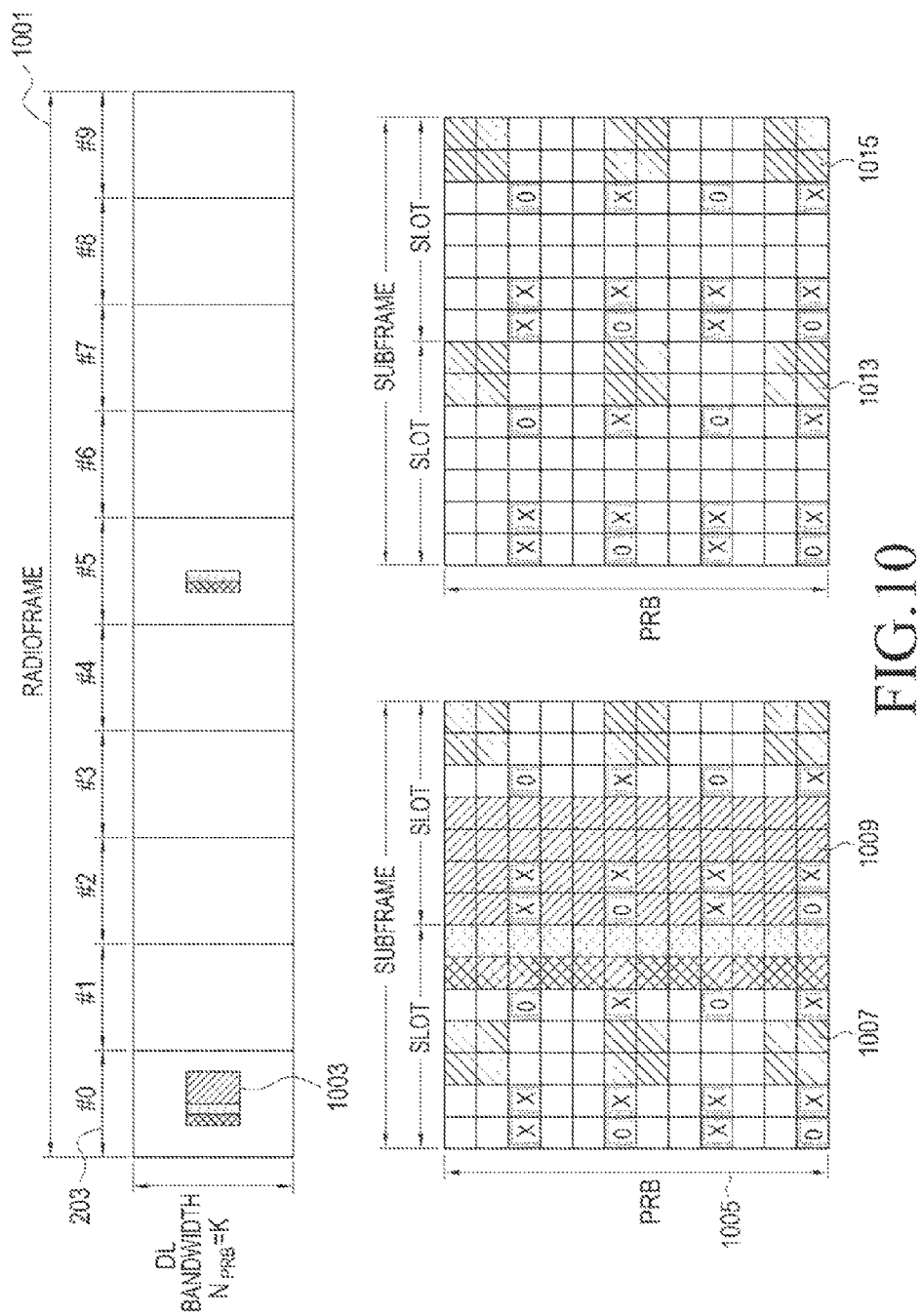
FIG. 10 illustrates a method for receiving a PBCH based on a DMRS and transmitting a DMRS therefore when an MTC terminal is incapable of receiving a CRS, according to an embodiment of the present invention.

FIG. 10 illustrates a method for receiving a PBCH based on a Demodulation Reference Signal (DMRS) and transmitting a DMRS, when an MTC terminal is incapable of receiving a CRS, according to an embodiment of the present invention.

Specifically, if the MTC terminal is incapable of receiving a CRS, though the base station transmits a PBCH using the same position and transmission method as the conventional ones, the existing terminal is set to receive the PBCH using a CRS and the MTC terminal is set to receive the PBCH using a DMRS. Accordingly, the DMRS is arranged so as not to collide with a PSS/SSS and a CRS.

Referring to FIG. 10, a PBCH 1003 is transmitted over the entire radioframe 1009, and a DMRS pattern 1007 is transmitted in all PRBs 1005 where the PBCH is transmitted. In PRBs 1011, where no PBCH is transmitted, DMRS patterns 1013 and 1015 are transmitted, and the DMRS patterns transmitted in the PRBs 1011 are used by terminals for data channel reception. The DMRS pattern 1007 transmitted in a PRB, where a PBCH is transmitted, is used for reception of only the PBCH. The resources 1013 and 1015 may not be transmitted with the resource 1007 at the same time.

When the resources are transmitted in this way, the base station transmits system information using one PBCH regardless of the number of transmission antennas and the transmission technique. In this case, the existing terminal may receive system information using a CRS, and the MTC terminal may receive system information using a dedicated DMRS pattern.

Figure 11:
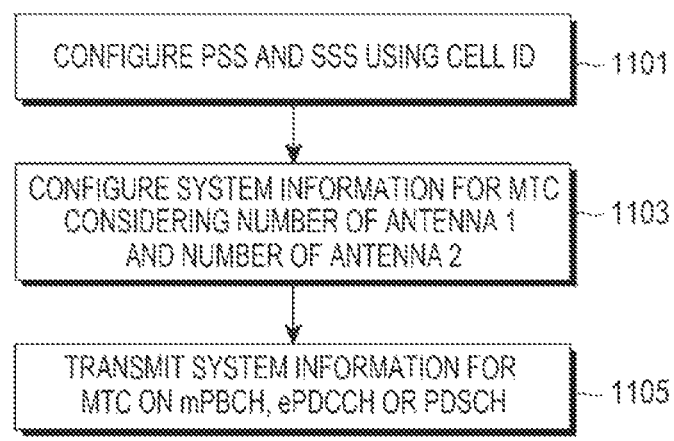
FIG. 11 is a flowchart illustrating a transmission method of a base station according to an embodiment of the present invention.

FIG. 11 illustrates a transmission procedure of a base station according to an embodiment of the present invention.

Referring to FIG. 11, the base station transmits its cell ID on a PSS and an SSS in step 1101. In step 1103, the base station configures first system information for the existing terminal and second system information for the MTC terminal, using first antenna configuration information and second antenna configuration information. In step 1105, the base station transmits the second system information in accordance with an embodiment proposed by the present invention.

Figure 12:
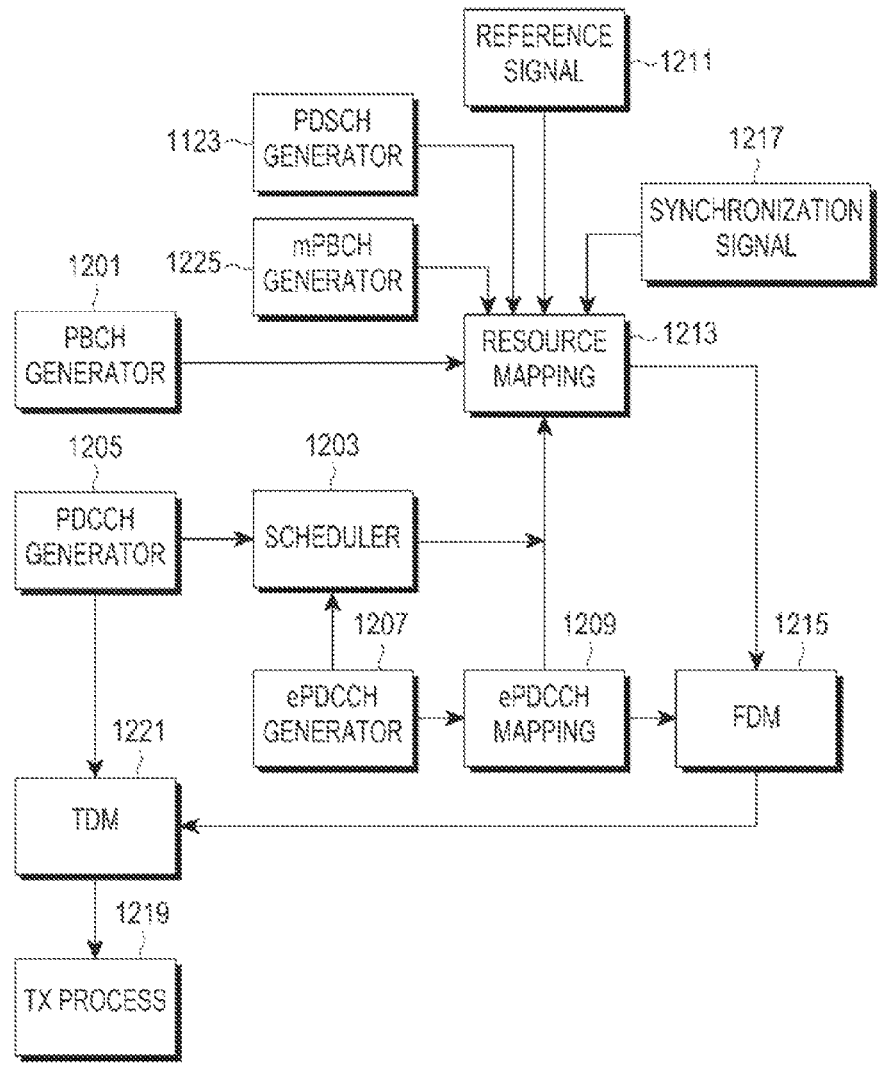
FIG. 12 illustrates a transmission device for a base station according to an embodiment of the present invention.

FIG. 12 illustrates a transmission device for a base station according to an embodiment of the present invention.

Referring to FIG. 12, for the existing terminal, the base station configures a control channel using a PDCCH generator 1205, and configures first system information using a PBCH generator 1201. This information is multiplexed with a data channel, a reference signal 1211, and a synchronization signal 1217 by a Frequency Division Multiplexing (FDM) unit 1215, the data channel being generated by a PDSCH generator 1223 using a data mapper 1213. This information is multiplexed with a control channel generated by the PDCCH generator 1205, using a Time Division Multiplexing (TDM) unit 1221.

For MTC, the base station configures second system information using a system information generator 1225, and maps an ePDCCH generated by an ePDCCH generator 1207 to the second system information using an ePDCCH mapper 1209. The mapping by the data mapper 1213 and the ePDCCH mapper 1209 is performed considering the first antenna configuration, and the transmission mode transmits system information considering the second antenna configuration. This information is multiplexed with the signal transmitted on another data channel using the FDM unit 1215, and is transmitted together with other signals by a transmitter 1219.

Figure 13:
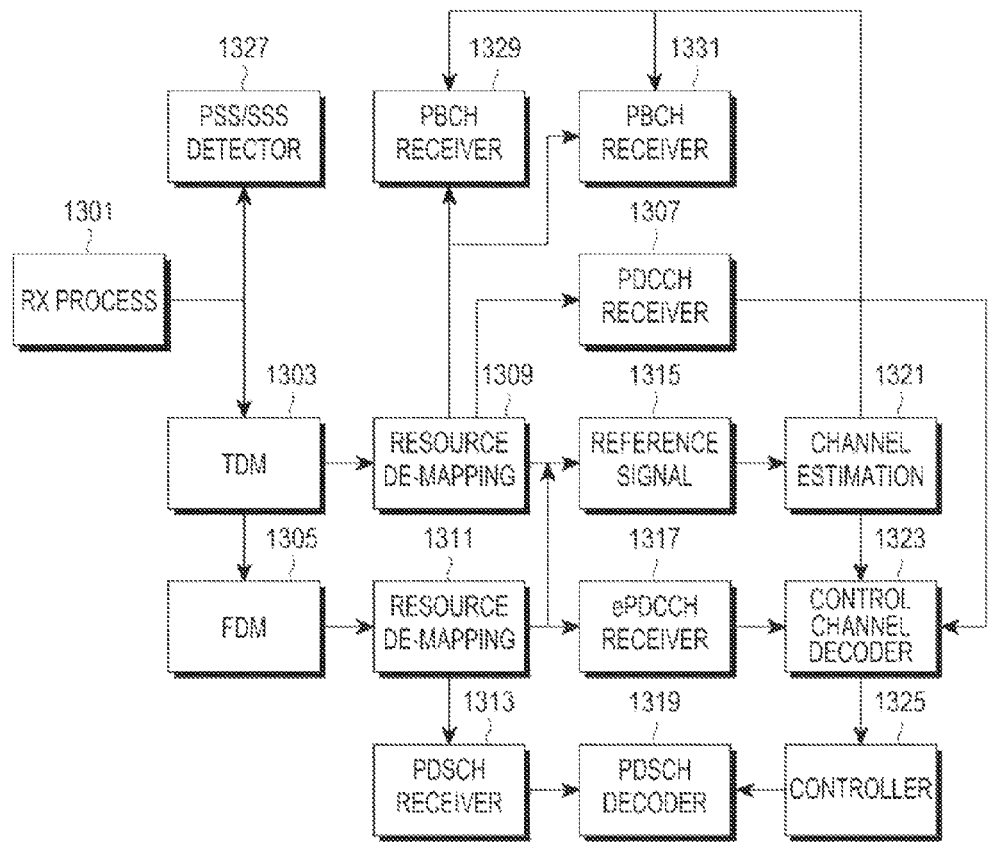
FIG. 13 illustrates a reception device for a terminal according to an embodiment of the present invention.

FIG. 13 illustrates a reception device for a terminal according to an embodiment of the present invention.

Referring to FIG. 13, the terminal receives a base station signal using a receiver 1301, and recognizes a cell ID by detecting a PSS and an SSS using a PSS/SSS detector 1327. The terminal divides the received signal into a control channel and a data channel using a TDM unit 1303.

The control channel is separated from a reference signal 1315 by a control channel receiver 1323, and a control channel 1307 is received using information estimated by a channel estimator 1321. The data channel is received through a first system information receiver 1329, second system information receiver 1331, an ePDCCH receiver 1317, and a PDSCH receiver 1313, using a resource demapper 1311. A base station controller 1325 receives data by controlling a data channel receiver 1319, using scheduling information received through the control channel receiver 1317 and the control channel decoder 1323.

As is apparent from the foregoing description, according to the above-described embodiments of the present invention, the base station may transmit system information supporting different multi-antenna transmissions.

According to an embodiment of the present invention, the base station transmits system information to a terminal using multi-antenna transmission being different from the antenna configuration used to transmit system information. The base station transmits, in the system information, information about the multi-antenna configuration used for actual transmission of a reference signal.

According to an embodiment of the present invention, a terminal receives system information using some of the multiple antennas used by the base station, recognizes the actual antenna configuration of the base station based on the received system information, and uses the recognized antenna configuration in an operation of receiving data and control channels, such that the base station may simultaneously support the terminals that support different multi-antenna configurations.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting system information in a mobile communication system, the method comprising:
configuring system information including first antenna configuration information and second antenna configuration information; and
broadcasting the system information,
wherein the second antenna configuration information comprises antenna configuration information of a machine type communications (MTC) device,
wherein the second antenna configuration information is scrambled with a cyclic redundancy check (CRC) included with the system information, and
wherein the second antenna configuration information comprises a number of antennas of the MTC device.

2. The method of claim 1, wherein the system information is transmitted on a physical broadcast channel (PBCH).

3. The method of claim 1, wherein the system information is transmitted on an enhanced physical downlink control channel (ePDCCH).

4. The method of claim 1, wherein the system information is transmitted on a physical downlink shared channel (PDSCH).

5. The method of claim 1, wherein the system information includes system information for a terminal having a single antenna.

6. The method of claim 1, wherein the second antenna configuration information is scrambled with the CRC using a system information-radio network temporary Identifier (SI-RNTI).

7. An apparatus for transmitting system information in a mobile communication system, the apparatus comprising:
a system information generator that configures system information including first antenna configuration information and second antenna configuration information; and
a transmitter that broadcasts the system information,
wherein the second antenna configuration information comprises antenna configuration information of a machine type communications (MTC) device,
wherein the second antenna configuration information is scrambled with a cyclic redundancy check (CRC) included with the system information, and
wherein the second antenna configuration information comprises a number of antennas of the MTC device.

8. The apparatus of claim 7, wherein the system information is transmitted on a physical broadcast channel (PBCH).

9. The apparatus of claim 7, wherein the system information is transmitted on an enhanced physical downlink control channel (ePDCCH).

10. The apparatus of claim 7, wherein the system information is transmitted on a physical downlink shared channel (PDSCH).

11. The apparatus of claim 7, wherein the system information includes system information for a terminal having a single antenna.

12. The apparatus of claim 7, wherein the second antenna configuration information is scrambled with the CRC using a system information-radio network temporary Identifier (SI-RNTI).

13. A method for receiving system information in a mobile communication system, the method comprising:
receiving system information on a broadcast channel; and
extracting first antenna configuration information and second antenna configuration information included in the system information;
wherein the second antenna configuration information comprises antenna configuration information of a machine type communications (MTC) device,
wherein the second antenna configuration information is scrambled with a cyclic redundancy check (CRC) included with the system information, and
wherein the second antenna configuration information comprises a number of antennas of the MTC device.

14. The method of claim 13, wherein the system information is received on a physical broadcast channel (PBCH).

15. The method of claim 13, wherein the system information is received on an enhanced physical downlink control channel (ePDCCH).

16. The method of claim 13, wherein the system information is received on a physical downlink shared channel (PDSCH).

17. The method of claim 13, wherein the system information includes system information for a terminal having a single antenna.

18. The method of claim 13, wherein the second antenna configuration information is scrambled with the CRC using a system information-radio network temporary Identifier (SI-RNTI).

19. An apparatus for receiving system information in a mobile communication system, the apparatus comprising:
- a receiver that receives system information on a broadcast channel; and
- a controller that extracts first antenna configuration information and second antenna configuration information included in the system information,
- wherein the second antenna configuration information comprises antenna configuration information of a machine type communications (MTC) device,
- wherein the second antenna configuration information is scrambled with a cyclic redundancy check (CRC) included with the system information, and
- wherein the second antenna configuration information comprises a number of antennas of the MTC device.

20. The apparatus of claim 19, wherein the system information is received over a physical broadcast channel (PBCH).

21. The apparatus of claim 19, wherein the system information is received on an enhanced physical downlink control channel (ePDCCH).

22. The apparatus of claim 19, wherein the system information is received on a physical downlink shared channel (PDSCH).

23. The apparatus of claim 19, wherein the system information includes system information for a terminal having a single antenna.

24. The apparatus of claim 19, wherein the second antenna configuration information is scrambled with the CRC using a system information-radio network temporary Identifier (SI-RNTI).

* * * * *